(12) United States Patent
Palekar et al.

(10) Patent No.: US 7,730,302 B2
(45) Date of Patent: Jun. 1, 2010

(54) SECURE AND MODIFIABLE CONFIGURATION FILES USED FOR REMOTE SESSIONS

(75) Inventors: Ashwin Palekar, Sammamish, WA (US); Elton Saul, Bellevue, WA (US); Ersev Samim Erdogan, Seattle, WA (US); Jeson Patel, Seattle, WA (US); Rajneesh Mahajan, Seattle, WA (US); Russell S. Morgan, Seattle, WA (US); Kevin London, Monroe, WA (US)

(73) Assignee: Microsoft Corporation, Redmond, WA (US)

( * ) Notice: Subject to any disclaimer, the term of this patent is extended or adjusted under 35 U.S.C. 154(b) by 1062 days.

(21) Appl. No.: 11/429,003

(22) Filed: May 5, 2006

(65) Prior Publication Data

US 2007/0260738 A1 Nov. 8, 2007

(51) Int. Cl.
*H04L 9/12* (2006.01)
*G06F 15/177* (2006.01)

(52) U.S. Cl. .......................................... 713/165; 726/1
(58) Field of Classification Search .................. 713/161
See application file for complete search history.

(56) References Cited

U.S. PATENT DOCUMENTS

| | | | | |
|---|---|---|---|---|
| 6,598,057 B1 * | 7/2003 | Synnestvedt et al. | ........ | 707/200 |
| 6,735,692 B1 | 5/2004 | Murphrey et al. | .............. | 713/1 |
| 6,959,331 B1 | 10/2005 | Traversat et al. | ............ | 709/222 |
| 7,526,516 B1 * | 4/2009 | Pavlyushchik | .............. | 707/205 |
| 7,577,848 B2 * | 8/2009 | Schwartz et al. | ............ | 713/187 |
| 2002/0032725 A1 | 3/2002 | Araujo et al. | ............... | 709/203 |
| 2003/0188195 A1 | 10/2003 | Abdo et al. | .................. | 713/201 |
| 2004/0025011 A1 * | 2/2004 | Azema et al. | ............... | 713/156 |
| 2004/0158546 A1 * | 8/2004 | Sobel et al. | ..................... | 707/1 |
| 2004/0181787 A1 | 9/2004 | Wickham et al. | ........... | 717/168 |
| 2005/0021935 A1 * | 1/2005 | Schillings et al. | .............. | 713/1 |
| 2005/0050174 A1 | 3/2005 | Kung | ........................ | 709/220 |
| 2005/0144474 A1 | 6/2005 | Takala et al. | ................ | 713/200 |
| 2006/0090084 A1 * | 4/2006 | Buer | .......................... | 713/189 |

OTHER PUBLICATIONS

Cruz, et al., "*Enabling Preos Desktop Management,*" CISUC—Dep. Eng. Informatica, University of Coimbra, available at "http://eden.dei.uc.pt/~psimoes/IM2003.pdf." (Copy enclosed 14 pages).

(Continued)

*Primary Examiner*—Matthew B Smithers
(74) *Attorney, Agent, or Firm*—Workman Nydegger

(57) ABSTRACT

Embodiments herein address some of the problems associated with compromised configuration files used in a remote sessions of a virtual computing environment. Accordingly, a subset of settings in a configuration file are secured from malicious or accidental modification, while other portions of the configuration file are modifiable by a user as desired without invalidating the integrity of the secure subset. This not only allows for the user to be assured of the integrity of the settings, but also allows an administrator of the remote or terminal server with the ability to control how and what access a client has to resources thereon. Such access may be further controlled based on a trust level between the client, server, and/or publisher of the configuration file.

18 Claims, 4 Drawing Sheets

OTHER PUBLICATIONS

Lopez, et al., "*Providing Secure Mobile Access to Information Servers with Temporary Certificates*," CICA, *available at* "http://www.terena.nl/conferences/archive/tnnc/8A/8A1/8A1.html" (Copy enclosed 7 pages).

Cable Television Laboratories, Inc., "*Superseded CableHome 1.1 Specification*," CableHome, Dec. 16, 2004, *available at* "http://www.cablelabs.com/specifications/archives/CH-SP-CH1.1-I06-041216-superseded.pdf" (Copy enclosed 366 pages).

\* cited by examiner

SECURE AND MODIFIABLE CONFIGURATION FILES USED FOR REMOTE SESSIONS

CROSS-REFERENCE TO RELATED APPLICATIONS

N/A

BACKGROUND

Although computers were once isolated and had minimal or little interaction with other computers, today's computers interact with a wide variety of other computers through Local Area Networks (LANs), Wide Area Networks (WANs), dial-up connections, and so forth. With the wide-spread growth of the Internet, connectivity between computers is becoming more important and has opened up many new applications and technologies. The growth of large-scale networks, and the wide-spread availability of low-cost personal computers, has fundamentally changed the way that many people work, interact, communicate, and play.

One increasing popular form of networking may generally be referred to as virtual computing systems, which can use protocols such as Remote Desktop Protocol (RDP), Independent Computing Architecture (ICA), and others to share a desktop and other applications with a remote client. Such computing systems typically transmit the keyboard presses and mouse clicks or selections from the client to a server, relaying the screen updates back in the other direction over a network connection (e.g., the Internet). As such, the user has the experience as if their machine is operating as part of a LAN, when in reality the client device is only sent screenshots of the applications as they appear on the server side.

In such virtual computing environments, clients typically rely on the configuration file (e.g., RDP file) to provide a number of settings for the user's connection to the remote or terminal server. These settings include, but are not limited to, server name, username, device redirection options, remote program executables (i.e., applications accessible by a user), and other settings that specify how the virtual computing session is launched. As can be seen, these settings control virtually all aspects of a remote session such as security protocols, display options including screen resolution and/or color depth, resource accessibility by the client and/or server (e.g., applications, drives, etc.), and other features and options.

As can easily be seen, because these configuration files affect many sensitive (e.g., security and performance) aspects of a remote session, these settings are an important attack vector in many threats against both the client system and the remote or terminal server. Today, this attack vector can be completely under the attacker's control. For example, the configuration file can be constructed anonymously and no information may be available to the client about its origins. Consequently, while launching a session the default user experience has to be designed for the worst-case, least-trusted scenario with scary warnings and frequent pop-ups that increase in complexity as the remote server feature set expands. These warnings are often inappropriate, which desensitizes the users and trains them to ignore all warnings, a suboptimal result. The effect is unacceptable security, poor performance, and bad user experience.

Nevertheless, there exits great potential harm for such an attack. For instance, if a malicious entity could compromise the configuration file, then the user may unintentionally expose parts of their system that are controlled by the secure settings. For example, if the server name entity was compromised, a malicious entity could redirect the user to a rogue server. Furthermore, if the device redirection option was compromised as well, the malicious entity could choose to redirect the user's local disk to the malicious server. The server would then have access to the data on the user's local machine. In a remote program scenario, if the malicious entity comprises the remote program executable setting, they could choose to run a malicious application; e.g., "format C:" where "C:" could be the user's redirected local drive—thereby wiping the user's hard drive clean.

In addition to the settings that have security and performance implications, the configuration file contains a number of settings that should be modifiable by the user. For example, the user should typically be able to modify the color depth and resolution of their connection. Accordingly, the problem exists in configuring a way to secure portions of a configuration file, while still allowing a client to modify settings that are less likely to be prone or used for attack purposes.

BRIEF SUMMARY

The above-identified deficiencies and drawback of current remote session systems are overcome through example embodiments described herein. For example, embodiments provide for mechanisms that protect against malicious or unintentional change of secure settings by verifying the integrity of a secure portion of a configuration file used for determining settings for connectivity with a remote server. Note that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one example embodiment, mechanisms provide for either a remote client or server to verify the integrity of secure portions of configuration file, while allowing non-secure portions of the configuration file to be modified by a user. In such an embodiment, a configuration file is received that includes settings that define options used for computing resources when connecting a client to a remote server for access thereto. A subset of such settings are identified as unchangeable secure settings, while another portion of the settings are also configurable settings that a client can set as desired without compromising the integrity of the secure settings. Thereafter, it is determined if the secure settings have changed in order to verify the integrity of the configuration file, such that if a secure setting has been altered the configuration file is invalidated for preventing the client from accessing the computing resources of the remote server.

In another embodiment, the administer of the remote computing server or some other publishing source may want to control connections settings against malicious or unintentional change that effect performance and/or compromise security of the client and/or remote server. In such an embodiment, configuration settings are received, which are used in communication between the client and remote server when allowing access to computing resources of the remote server. A subset of the configuration settings is identified as unchangeable settings; however, the remaining settings are configurable settings that are allowed to be set by the client as desired. Thereafter, a configuration file is created by securing the unchangeable settings to generate secure settings used to verify the integrity of the configuration file such that any change to the secure settings will invalidate the configuration file and prevent the client from access to the computing resources of the remote server. The configuration file is then published or sent to the client for use in connecting with the remote server.

Note that in both the above embodiments, a configuration file is generated that is data structure with novel and advantageous features therein. For example, the data structure may include the subset of secure settings marked as unchangeable such that if a secure setting has been altered the configuration file is invalidated for preventing the client from access to computing resources of the remote server. Further, as previously described, the data structure includes a set of configurable settings that a client can set as desired without compromising the integrity of the secure settings.

Typically a hash or some other representation of the secure settings are included in the configuration file and encrypted by a publishing source (e.g., an administrator of the remote server) that created the configuration file. Also, the configuration file usually includes a list of the secure properties that could be used by the client and/or the remote server for identifying the secure properties or settings when generating a hash or other representation to compare with the secure settings encrypted by the publishing source. If the secure settings are signed by the publishing source, the configuration file will usually also include certificates that identity the trust level of the publishing source for further authentication of the configuration file when determining if it should be used in connecting the client to the remote server.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantageous features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
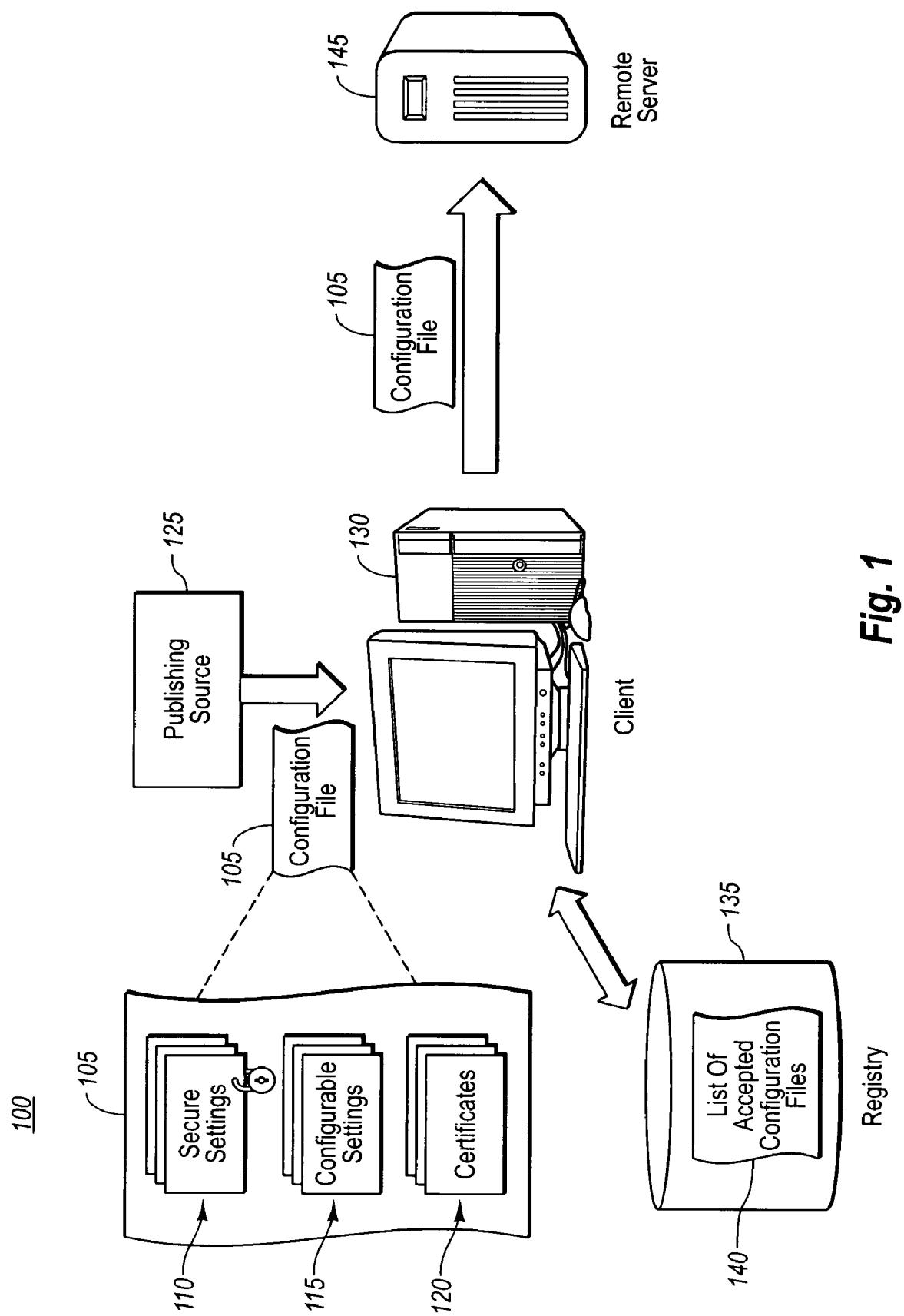
FIG. 1 illustrates a distributed system that utilizes a configuration file with secure settings for protecting malicious or unintentional change thereof in accordance with example embodiments.

The present invention extends to methods, systems, and computer program products for protecting secure portions of a configuration file used in a remote session from malicious or unintentional change, while allowing other portions to be configurable. The embodiments of the present invention may comprise a special purpose or general-purpose computer including various computer hardware or modules, as discussed in greater detail below.

As previously mentioned, embodiments herein address some of the problems associated with compromised configuration files that are used in remote sessions of a virtual computing system environment (e.g. a remote desktop, presentation, assistance, etc.). Accordingly, embodiments secure a subset of settings in a configuration file from malicious or accidental modification, while still allowing a user to modify portions as desired without invalidating the integrity of the secure subset. In addition to ensuring the integrity of the settings, this embodiment also allows an administrator of the remote or terminal server with the ability to control how and what access a client has to its resources. For example, in some embodiments the administrator signs or otherwise secures the settings in the configuration file; rejecting such settings if they change.

Such access may be further controlled based on a trust level between the client, server, and/or publisher of the configuration file. In other words, embodiments provide (among other things) for: the ability for a client in a client/server application to validate the integrity of a subset of settings in a configuration file; the ability of a server in a server/client application to control access to computing resources based on the integrity of the client's settings in the client's configuration file; and the use of different levels of trust for not only determining what settings should be secure, but also for determining if further validation or authentication of the publication source for the configuration file is needed.

Although more specific reference to advantageous features are described in greater detail below with regards to the Figures, embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

FIG. 1 illustrates a distributed system 100 with a client/server relationship that uses a configuration file for connecting to resources of the remote or terminal server. Such system may be, for example, a remote desktop where the client 130 requests access to applications, files, and other computing resources of the remote server 145. Similarly, the client/server 130/145 relationship may be one of a remote assistance session that allows an expert on the server-side 145 to connect to and assist a novice user on the client-side 130 for computing lessons and/or other assistance in fixing computer problems. Other types of virtual computing systems include a presentation environment where one computing device directs and facilitates a display presentation to a multitude of client 130 devices. Of course, there are other similar computing configurations for remotely accessing or facilitating resources that are contemplated herein and that use a configuration file for determining settings between the client 130 and remote server 145. Accordingly, the use of a particular type of virtual computing environment or a particular protocol thereof (e.g., remote desktop protocol (RDP)) as described below is for illustrative purposes only and is not meant to limit or otherwise narrow the scope of embodiments unless explicitly claimed.

Regardless of the type of virtual computing system or protocol used for remotely accessing resources of a server 145, embodiments herein use a configuration file 105 for determining the settings of a remote session. Such settings may include: the server name; the username; the device redirection options; remote programming executables; display settings (e.g., color depth settings, resolution settings); or any other well known settings that describe the functionality and other features of the remote session. This configuration file 105 is typically generated by a publishing source 125, which may or may not be the remote server 145. As will be described in greater detail below, when the publishing source 125 is the remote server 145 an administrator of the remote server 145 can adjust the secure settings for controlling how and what settings can be configured. This allows for enhanced performance as well as protection against compromise of settings for the remote server 145 that have security implications.

The configuration file 105 will typically include (as shown in the expanded version of the configuration file 105) secure settings 110, configurable settings 115, and optionally various certificates 120 used to authenticate the publishing source 125. Note that typically the secure settings 110 of the configuration file 105 will have security implications; however, not all such settings 110 need to violate security policies. For example, as mentioned above, in the remote program scenario an administrator of the remote server 145 may deploy a specific set of programs to their users. The administrator may want to control which remote programs are allowed to run on a particular remote or terminal server 145. The administrator may even want to go as far as control which connection settings 105 are allowed for a particular remote program. Accordingly, the secure settings 110 as described herein are meant to encompass any setting for which restriction for modification is desired regardless of the reason for doing so. Therefore, the use of any particular type of setting within the secure settings 110 is used herein for illustrative purposes only and is not meant to limit or otherwise narrow the scope of the embodiments unless explicitly claimed.

Regardless of the types of settings used for secure settings 110, these settings are secured by the publishing source 125 as indicated by the lock mechanism. As will be recognized, the secure settings 110 may be secured in any number of ways. For example, one mechanism allows for the encryption of the secure settings 110 (or representation thereof) using a shared key, public/private key pair, or some other symmetric or asymmetric type of encryption mechanism. In one embodiment, a hash or other representation of the secure settings 110 is signed by the publishing source 125 or some other trusted source. In the event that configuration file 105 is signed by the publishing source 125, typically certificates 120 or a certificate chain will also be included within the configuration file 105 for use as will be described in greater detail below.

Without regard to how the secure settings 110 are secured, the configuration file 105 will also include configuration settings 115, which allow a user or client 130 to modify such settings 115 without violating or invalidating the integrity of the secure settings 110. Of course, there may be other data structures included within the configuration file 105, some of which are described in greater detail below. For example, also typically included within the configuration file 105 is a listing of the secure settings (not shown).

The publishing source 125 sends the configuration file 105 to the client 130 for use in connecting to the remote server 145. When the configuration file 105 is received by either the client 130 and/or the remote server 145, the integrity of the secure settings 110 may be verified in several ways. For example, in the instance that the secure settings 110 have been hashed and signed, a hash of the secure settings within the configuration file 105 itself can be generated by the client 130 and/or remote server 145. Next, the encrypted secure settings 110 (or hash or other representation thereof) can be decrypted in any well known manner. For example, if the secure settings 110 are encrypted using the private key of the publishing source 125, the publishing source's 125's public key may be used to decrypt the secure settings. Of course, as previously mentioned, other mechanisms for encrypting and decrypting are also available and contemplated herein, for example, through a shared key process.

Regardless of how the secure settings 110 have been encrypted or decrypted, the representation (e.g., a hash) of the secure settings 110 are compared to those that are included within the configuration file 105. For example, comparison of the generated hash of the secure settings 110 may be compared with the decrypted hash for determining if there's been any change to the secure settings 110. In the event that the secure settings 110 have been tampered with, the user generated hash or other representation will be different than the one generated by the application publishing source 125. In such event, client 130 and/or the remote server 145 may reject the configuration file 105 or otherwise invalidated it such that it cannot be used for accessing the resources on the remote server 145.

Note that there may be other mechanisms used for securing and verifying the integrity of the secure settings 110. For example, the secure settings 110 or some representation thereof (e.g., a hash) may be compared with a data structure securely retrieved from the publishing source 125 over a network connection. Of course, there are other mechanisms for verifying the integrity of the secure settings 110 as contemplated and implemented herein. Accordingly, any specific mechanism used for determining the integrity of the secure settings 110 as described herein is for illustrated purposes only and is not meant to limit or otherwise narrow the scope of embodiments unless otherwise explicitly claimed.

The configuration file itself (e.g., RDP file) typically maintains a list of what settings are secure settings 110. Accordingly, the representation of the secure settings 145 (e.g., a hash thereof) in the configuration file 105 is generated by the properties or settings in the secure setting list. Accordingly, if the list or the hash in the configuration file 105 is modified, the resulting hash or identifiers will not match. Further, a signature field within the configuration file 105 may specify that the hash has been signed, and the certificate 120 chain or fields may specify those certificates used to sign the hash or representation of the secure settings 110.

Figure 2:
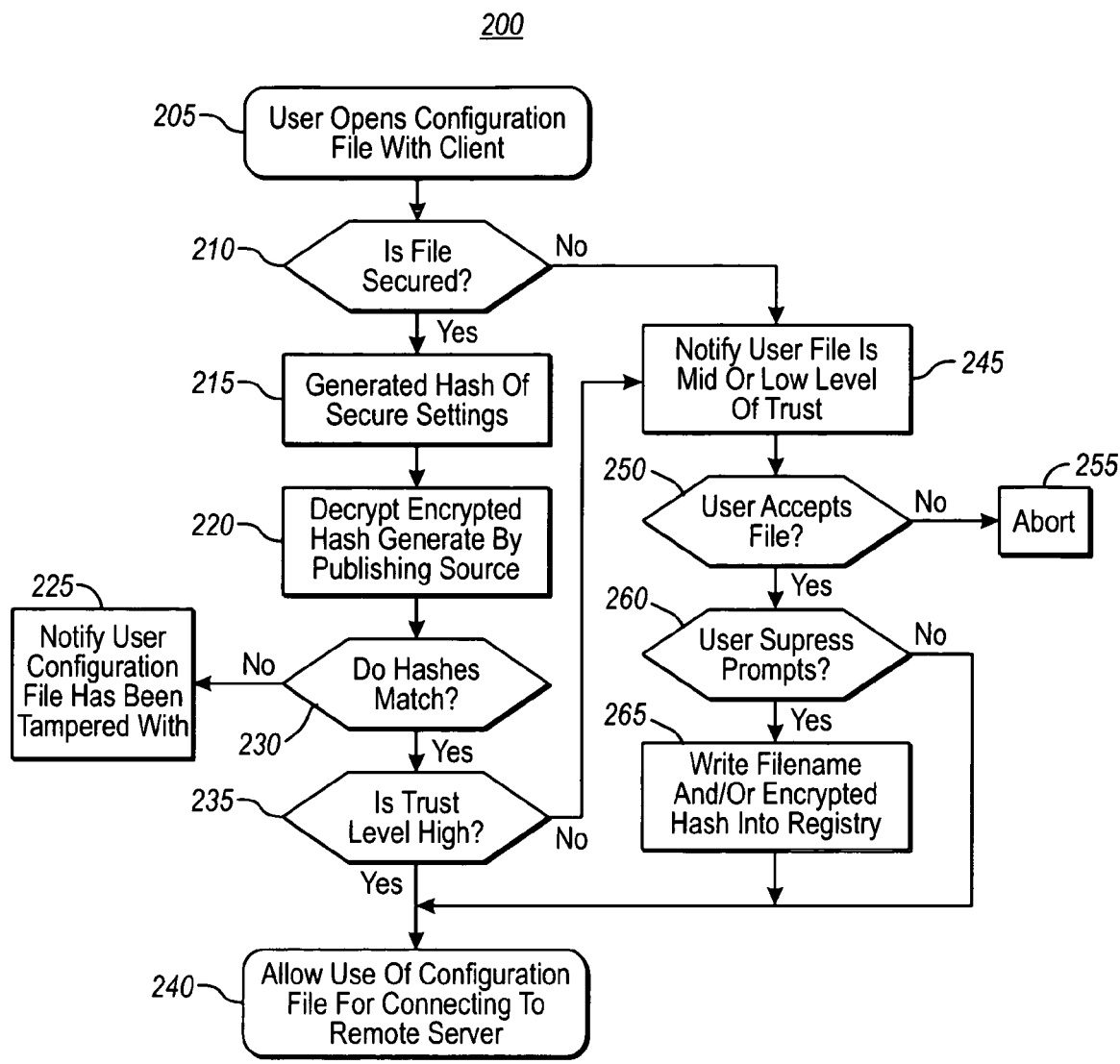
FIG. 2 illustrates a flow chart for verifying the integrity of a configuration file and a trust level associated therewith in accordance with example embodiments.

When the client 130 reads a configuration file 105 to verify the file's integrity, typically it follows a process in accordance with embodiments herein as generally described in a validation sequence above. FIG. 2 illustrates a flow diagram 200 of a specific implementation of such a process for not only validating the integrity of the secure portions of a configuration file 105, but also authenticating a publishing source 125 based upon various levels of trust. Note that the following discussion of FIG. 2 makes reference to specific implementation details such as using a hash for secure settings 110, signing of the hash for validating the integrity of the secure settings 110, and other specific details for determining a trust level between various components and modules of the current system. Note, however, that as one would recognize many of these details may be implemented in various manners. As such, the following specific implementations referred to in FIG. 2 are for illustrated purposes only and are not meant to limit or otherwise narrow the scope of embodiments herein.

Figure 3:
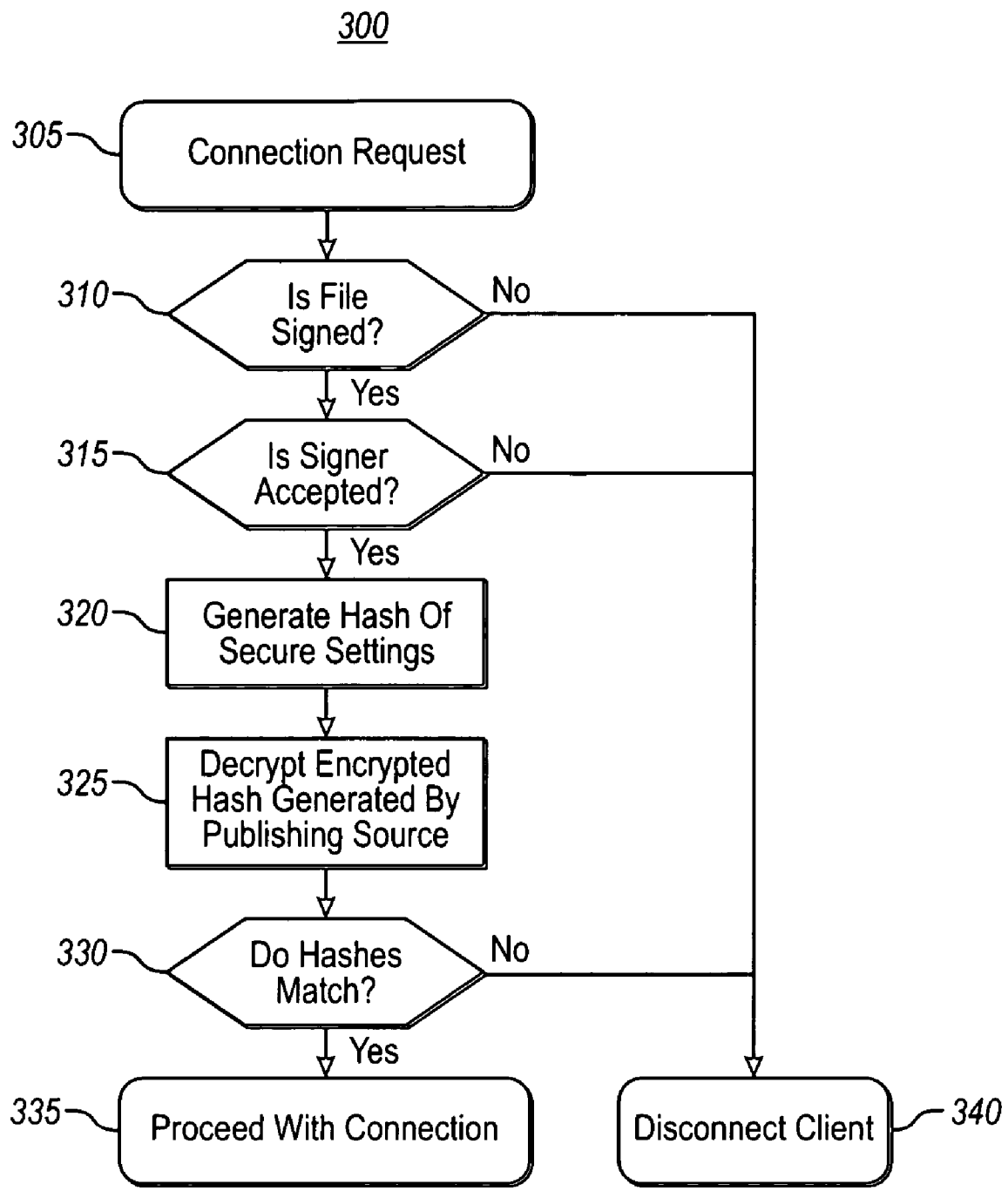
FIG. 3 illustrates a flow chart from the perspective of a remote server for determining if a connection should be established based on the signing and secure portions of a configuration file in accordance with example embodiments.

Further note that the following description of the flow charts for both FIGS. 2 and 3 will occasionally refer to corresponding elements from FIG. 1. Although reference may be made to a specific element from this Figure, such references are used for illustrative purposes only and are not meant to limit or otherwise narrow the scope of the described embodiments unless explicitly claimed.

The flow chart 200 in FIG. 2 begins at block 205 with the user opening or otherwise requesting access to the configuration file 105 using client 130. Note that the process described in flow chart 200 may also be implemented upon an initiation to connect with the remote server 145. In such an embodiment, the user may be allowed to open and modify configurable settings 115, while the validation of the integrity of the secure settings 110 occurs upon initiation of such connection.

In any event, in decision block 210 it is determined whether or not the file (i.e., configuration file 105) is secured. If it is not, the chart proceeds to the right in the "No" direction to box 245 to notify the user of a particular trust level as will be described in greater detail below. On the other hand, if the configuration file 105 is secured, flow chart 200 proceeds to box 215 as will be described hereinafter. Again it is noted that the securing of the configuration file 105 may be achieved in any numerous ways as described herein. For example, the configuration file 105 may be secured through a signing that uses one or more certificates 120 to encrypt at least the secure settings 110 of the configuration file 105. The certificates 120 or chain can also be serialized and placed within the configuration file 105 along with the signature for securing the various items within the configuration file 105.

Regardless of how the configuration file 105 is secured, in this specific implementation flow chart 200 proceeds to box 215 where a hash is generated of the secure settings 110. For example, the secure settings 110 may be identified through a list of secure settings either within the configuration file 105 or retrieved through some other mechanism such as from the publishing source 125 over a network connection (e.g., Internet). Note also that the list of secure settings 110 may be identified by any other various ways such as using markers or any other well known mechanisms. Based on the list, the secure settings 110 may then be ordered, (e.g., alphabetically or otherwise to generate consistencies in hashing algorithms) and a hash or other representation thereof generated.

Next, the unencrypted hash typically located within the configuration file 105 is decrypted in box 220. Note that the encrypted hash is typically generated by the publishing source 125 upon creation of the configuration file 105. Next, in decision block 230 it is determined whether or not the hashes (or other representations) match. If they do not match, the flow chart 200 follows to the left into box 225 to notify the user that the configuration file 105 has been tampered with. Note that such notification may be in many various forms such as, e.g., a dialog box may be presented to the user indicating an error, the process my automatically abort, or any other various known mechanisms that provides feedback to the user for such error are contemplated herein.

If, on the other hand, the hashes do match, one embodiment automatically allows for the use of the configuration file 105 for connecting to the remote server 240. Note that the validity of the integrity of the configuration file 105 only indicates that the secure settings 110 in the file 105 have not been modified after the file 105 has been generated. Additional steps may need to be taken to determine whether the configuration file 105 (e.g., the signing certificate 120) is trusted. As previously mentioned, two options may be to either have the trust validation done upon opening the file 105, or when a connection is initiated between the client 130 and the server 145. If the trust validation is done when the configuration file 105 is open the user will not be able to open untrusted files 105 even for editing. On the other hand, if the trust validation is done during the initiation of a connection between the client 130 and the remote server 145, the user can open and edit the configuration file 105, but only initiate a connection if the settings 110 are trusted. The benefit of using this later approach, is that the trust validation only occurs when a connection is attempted, which is when an attack is possible using "bad settings." A default may be set such that the trust validation takes place using an opening action.

The flow chart 200 shows a decision blocks 235, which determines a trust level in accordance with alternative embodiments. In other words, embodiments allow the client 130 to also incorporate different levels of trust into configuration files 105. In one embodiment, the base level of the trust is unsigned or unsecured, wherein the configuration file does not contain a signing form the publishing source 125 (e.g., a signed hash of secure settings 110). As such, referring back to box 210 the configuration file is considered unsecured and the flow chart in 200 proceeds to the right of box 210 to notify the user the configuration file is of low level of trust in box 245.

Additional levels of trust are based on the publishing source's 125's certificate 120. Of course, there are other mechanisms for determining and developing a trusted relationship between the various components described herein. Nevertheless, in one embodiment, the certificate store that the publishing source 125 belongs to and the certificates enhanced key usage (EKU) type are two factors that may determine a level of trust. An example of a high trust verses a medium trust signed configuration file 105 may be a file signed by a corporation's certificate authority (CA), verses one 105 signed by a public CA. Within a corporation, files 105 signed with the particular corporation's certificate could be considered more secure versus one 105 signed by a public or third party certificate. For discussion purposes herein, embodiments consider three levels of trust which include low (e.g., unsigned files), medium (e.g., files signed by public CA), and high (files signed by corporation CA). Note, however, that here may be other levels of trust that may be assigned to various embodiments based upon any policy considerations that a client 130, publishing source 125, and/or remote server 145 may require. Accordingly, the use of the three levels of trust are for illustrative purposes only and are not meant to limit or otherwise narrow the scope of embodiments herein unless explicitly claimed.

As noted in decision block 235 of flow chart 200, it is determined whether or not the trust level is high for deciding whether to block the configuration file, prompt the user with an appropriate notification describing the nature of the configuration file 105, or seamlessly allow the configuration file 105 to be used. In one embodiment, if the trust level is high the flow diagram proceeds to box 240 to allow use of the configuration file 105 for connecting to the remote server 145. As an alternative to such seamless connection, if the trust level is not high then the flow diagram continues along the "No" flow up to box 245, which notifies the user that the configuration file 105 is of medium or low level of trust.

As shown in decision block 250 of flow chart 200, the user may then be prompted as to whether or not the configuration file 105 should be trusted even though the trust level is something other than high. Note, however, that in some embodiments no direct input may be needed by the user. For example, based on the policy set by the user, it may be determine that configuration files 105 of a low level of trust should never be allowed, in which case the user is considered to not accept the file 105. Otherwise, the user may be presented with a dialog box requesting input as to whether or not the configuration file 105 should be accepted and used. If the user rejects the file 105 in decision block 250, the process aborts 255 or otherwise causes some other appropriate action. On the other hand, if the user chooses to accept the file in decision block 250, the system may proceed to block 240 for allowing the use of the configuration file 105 for connecting remote server 145.

Note that the decision to allow a client 130 to accept configuration files 105 based on trust levels may be limited by group policy settings. For example, an administrator over the client may allow the user to accept unsigned files 105, accept signed files from untrusted publishers 125, or only allow the user to accept signed files 105 from trusted publishing sources 125. As will be further described below, the acceptance of the file 105 may further be contingent on requirements from the remote server 145.

In such case where the client 130 prompts the user regarding the configuration file 105, the user may be given the option to prevent subsequent prompts for that particular file 105 and/or publishing source 125. In other words, if the user accepts the file 105 in decision block 250 the user may be provided with a prompt as to whether or not the user wants to suppress future prompts in decision box 260. If the user chooses to suppress further prompts for a given configuration file 105, flow diagram 200 proceeds to box 265 to write a file name, publishing source name, and/or an encrypted hash (or other identifier or representation) of the file 105 into a registry. For example, referring to FIG. 1, client 130 upon receiving a input from the user may add the configuration file 105 to the list of accepted configuration files 140 in registry 135. As such, the remote client 130 checks the registry 135 for a particular file name and/or hash pair (or publishing source's name) to determine whether it should or shouldn't prompt the user in future attempts to communicate with the remote server 145. In other words, if the file name, publishing source's identifier, and/or encrypted hash are located within the registry 135 as part of the list of accepted configuration files 140 the system will seamlessly allow for use of such configuration file 105 and proceed as if the trust level was high.

When it is determined that the configuration file 240 should be used for connecting to the remote server 145, the client 130 may send the configuration file 105 (including the secure settings 110, configurable settings 115, and any certificates 120) to the remote server 145 typically during a connection sequence. Note that in the event that the secure settings 110 are secured as described above with regard to signed hash, such signed hash, listing of secure settings 110, and/or other appropriate data structures may also be included within the configuration file 105.

In order to control access to the remote or terminal server 145, the server 145 may discriminate (among other things) based on the signer of the client's 130's configuration file 105. Accordingly, as shown in FIG. 3, a flow chart 300 is provided wherein a connection request 305 is being made. As shown in decision block 310 it may be determined whether or not that the configuration file 105 is signed. If the remote server 145 does not allow unsigned configuration files 105, then the remote server 145 may disconnect the client 130 as shown in box 340. Alternatively, if the configuration file 105 is signed flow chart 300 proceeds to decision block 315 to determine if the signer has been accepted. Similar to above if the signer is not accepted, then the client 130 may be disconnected as shown in box 340. Otherwise, the certificate 120 or certificate chain is compared with the list of accepted certificates to determine whether or not the configuration file 105 is from an acceptable signed publishing source 125.

If the signer is valid, the server 145 will proceed to verify the integrity of the file 105 or secure settings 110 in a similar manner as that described above. More specifically, the remote or terminal server 145 validates the client's 130's configuration file 105 by comparing secure settings 110 against stored values for determining if a change has been made thereto. For example, as shown in flow chart 300, a hash of the secure settings 110 may be generated in block 320, an encrypted hash generated by the publishing source 125 may be decrypted in block 325, and the two can be compared to determine if the hashes match 330 as shown in decision block 330. If a match is found, then the flow chart 300 proceeds to connect the client 130 as shown in block 335; otherwise the client 130 is disconnected within block 340.

Note that the determination of what settings within configuration file 105 are to be secured may occur in any number of ways. For example, the publishing source 125 may independently determine which settings are to be secured and included in the list as previously mentioned. The client 130 may also have some input on which settings (e.g., drive redirection) have security implications that they wish to secure. As mentioned above, however, often times an administrator of the remote server 145 may be the publishing source 125. In such case, the administrator may desire finer grained control over what connection settings are allowed for a particular client 130 due to lack of a trusted relationship.

As such, another embodiment allows for the determination of the secure settings 110 to be based upon a trusted relationship between the client 130 and the remote server 145. In other words, the higher degree of trust between the client 130 and the remote server 145, the larger the number of configurable settings 115 that are allowed for the client 130 to otherwise modify. Accordingly, as the trusted relationship between the client 130 and the remote server 145 increases, the remote server 145 can be more confident in the client's 130's discretion in use of appropriate configuration settings.

As mentioned above, however, the administrator will typically want high degree of control over the computing resources accessed by the client 130. Accordingly, the administrator could go as far as to say that only configuration files 105 created by a particular publishing source 125 (such as the remote server 145) are to be allowed. Also, there may be a set of secure settings 110 that are indicated by the administrator, the publishing source 125, and/or client 130 as must being signed or secured. In other words, regardless of the trusted relationship noted above, other embodiments require that certain settings (may be some sort of default settings) must be signed and/or otherwise secured within the configuration file 110 such that any change thereto will invalidate the file and cause the connection to be terminated.

As previously noted, the secure settings 110 do not have to be restricted to settings that have security implications. For example, an administrator may choose to enforce a low color depth for a particular remote program that is graphically intensive in order to save bandwidth. The administrator has the ability to pick and choose which settings they want to secure. Accordingly, any policies can be set to automatically control the types or various settings that are to be controlled as described herein.

The present invention may also be described in terms of methods comprising functional steps and/or non-functional acts. The following is a description of steps and/or acts that may be performed in practicing the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use of steps and/or acts in the recitation of the claims—and in the following description of the flow diagrams for FIGS. 4 and 5—is used to indicate the desired specific use of such terms.

Figure 4:
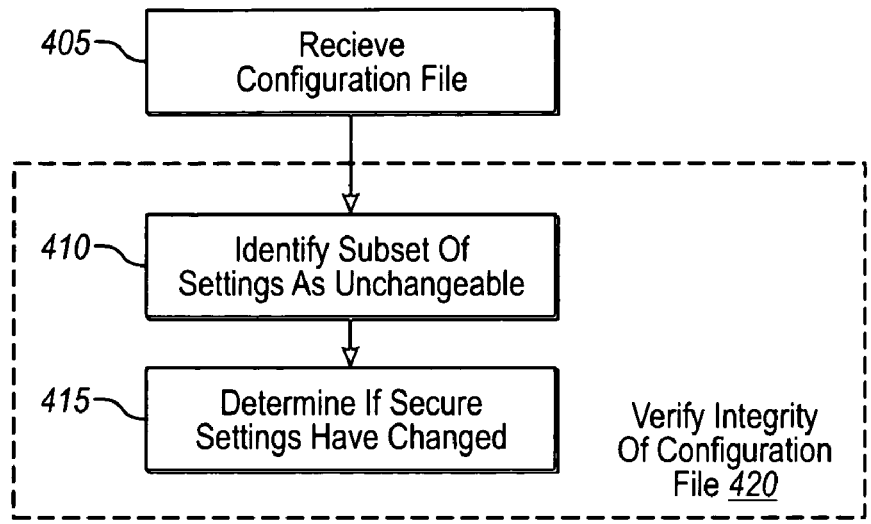
FIG. 4 illustrates a flow diagram of a method of verifying the integrity of a secure portion of a configuration file in accordance with example embodiments.
Figure 5:
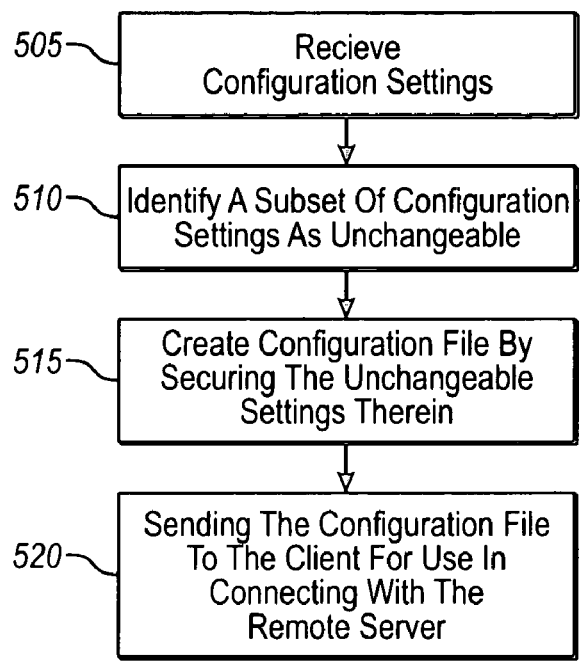
FIG. 5 illustrates a flow diagram of securing a portion of a configuration file for protecting against malicious or unintentional change of secure settings therein in accordance with example embodiments.

As previously mentioned, FIGS. 4 and 5 illustrate flow diagrams for various exemplary embodiments of the present invention. The following description of FIGS. 4 and 5 will occasionally refer to corresponding elements from FIG. 1. Although reference may be made to a specific element from this Figure, such references are used for illustrative purposes only and are not meant to limit or otherwise narrow the scope of the described embodiments unless explicitly claimed.

FIG. 4 illustrates a flow diagram of a method 400 for verifying the integrity of a secure portion of a configuration file used for determining settings for connectivity with a remote server 145. Method 400 includes an act of receiving 405 a configuration file. For example, the client 130 and/or remote server 145 may receive configuration file 105 that includes settings that define options used for computing resources of a remote session. Method 400 further includes a step for of verifying 420 the integrity of configuration file.

More specifically, step for 420 includes an act of identifying 410 a subset of settings as unchangeable. For example, the client 130 and/or remote server 145 may identify secure settings 110 as being unchangeable, and may also identify within configuration file 105 configurable settings 115 that client 130 can set as desired without compromising the integrity of secure settings 110.

Note that the determination of the secure settings 110 may be based on a trust level between client 130 and remote server 145, wherein a higher degree of trust between the client 130 and the remote server 145 allows for a higher number of configurable settings 115 and a lower number of required secure settings 110. Nevertheless, other embodiments indicate that some of the settings for the secure settings 110 may be marked as must not change regardless of the trust level between the client 130 and the remote server 145.

Step for 420 also includes an act of determining 415 if secure settings have changed. For example, either client 130 or remote server 145 may determine if secure settings 110 have changed in order to verify the integrity of the configuration file 105, such that if a secure setting 110 has been altered the configuration file is invalidated for preventing the client 130 from access to resources of the remote server 145. Note that in one embodiment, the determination of whether or not the secure settings 110 have changed may be based on first generating a hash of the secure settings 110 within the configuration file 105. Further, the identifying of the secure settings 110 may be based upon a list of secure settings 110 within the configuration file 105 itself. Otherwise, it may also be based upon a listing received from publishing source 125 over a network connection, e.g., the Internet.

Next, an encrypted hash of the secure settings 110 is decrypted as previously described, which may be included within the configuration file 105. The generated hash is then compared with the decrypted hash of the secure settings 110 for determining if the secure settings 110 have changed. Note that the encrypted hash of the secure settings 110 may be signed by a trusted source that created the configuration file 105 (e.g., publishing source 125, which may be remote server 145). Also note that the remote server 145 or the publishing source 125 may sign the secure settings 110 or configuration file 105 with either a symmetric or asymmetric key in order to have fine grain control over settings that effect performance or otherwise compromise the security of the remote server 145 and/or client 130.

In the event that the configuration file 105 is published by a source that secured the settings (e.g., publishing source 125), upon determining the integrity of the secure settings 110 it may also be determined if the configuration file should be used based on a trust level for the publishing source 125. In such an embodiment, a first level of trust is identified for the publishing source based on whether or not the configuration file 105 is signed or unsigned by the publishing source 125. If the configuration file is signed, a second level of trust may be identified for the publishing source 125 based on certificates 120 used to sign the configuration file 105. Based on the first trust level and/or the second trust level it may then be determined whether or not the configuration file 105 should be used for allowing the client 130 access to the computing resources of the remote server 145.

Note that the first and/or second trust levels may be determined upon opening the configuration file 105 such that only upon ensuring that a signature is from a trusted source will the client 130 be allowed to open the configuration file 105 for editing the configurable settings 115. Alternatively, the first and/or second trust levels may be determined upon initiating a connection to the remote server 145 in order to allow the client 130 to open and edit the configurable settings 115 of the configuration file 105, but only initiate a connection with the remote server 145 if the configuration file 105 is trusted. Also note, that another embodiment allows the client 130 to present a user with an option to trust publishing source, wherein the client 130 receives user input indicating that the publishing source 125 should be trusted an identifier for the configuration file is added to a registry 135 of trusted configuration files 140 in order to allow the use of the configuration file 105 for subsequent connections to the remote server 145.

FIG. 5 illustrates a flow diagram of a method 500 for protecting against malicious or unintentional changes of settings by securing a portion of a configuration file used during connectivity with a remote server. Method 500 includes an act of receiving 505 configuration settings. For example, publishing source 125 may receive configuration settings used during communication between a client 130 and remote server 145 when allowing the client 130 access to computing resources of the remote server 145. Method 500 also includes an act of identifying 510 a subset of configuration settings as unchangeable. For example, publishing source 125, which may include remote server 145, may identify a subset of configuration settings as unchangeable settings wherein the remaining settings for the configuration settings are configurable settings 115 that are allowed to be set by the client 130 as desired.

Method 500 also includes an act of creating 515 a configuration file by securing the unchangeable settings therein. For example, publishing source 125 may create configuration file 105 by securing the unchangeable settings therein to generate secure settings 110 used to verify the integrity thereof such that any change to the secure settings 110 will invalidate the configuration file 105 and prevent the client 130 from access to the computing resources of the remote server 145. Note that the configuration file may be signed by the publishing source 125 that created the configuration file in order to allow the client 130 and/or the remote server 145 to further authenticate the configuration file 105 based on a trust level with the publishing source 125.

In one embodiment, the secure settings 110 may be secured by the following: taking a hash of the secure settings 110 and the configuration file 105, signing the hash with the publishing source's 125's private key, and including the signed hash within the configuration file 105 prior to sending the configuration file 105 to the client. Note that the secure settings 110 may be signed by the remote server 145 with a key in order to have fine grain control over settings that affect the performance or otherwise comprise security of the remote server 145.

Regardless of how the secure settings are secured 110 and included within the configuration file 105, method 500 finally includes an act of sending 520 the configuration file to the client for use in connecting with the remote server. For example, upon request or otherwise prompting, publishing source 125 may send the configuration file 105 to the client 130 for use in connecting with remote server 145 as previously described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a distributed computing system that allows a client access to computing resources of a remote server, a method of protecting against malicious or unintentional change of secure settings by verifying integrity of a secure portion of a configuration file used for determining settings for connectivity with the remote server, the method comprising:

a client receiving a configuration file from a publishing source, the configuration file including a plurality of settings that define options to be used during a remote session between the client and a remote server;

the client identifying, from the plurality of settings, a subset of the plurality of settings as unchangeable secure settings, wherein the plurality of settings also include configurable settings that the client can set as desired without compromising an integrity of the unchangeable secure settings;

the client determining if the unchangeable secure settings have changed in order to verify the integrity of the configuration file, such that if any of the unchangeable secure settings has been altered the configuration file is invalidated for preventing the client from access to the one or more computing resources of the remote server; and if it is determined that the unchangeable secure settings have not changed, such that the integrity of the configuration file is verified, the client sending the configuration file to the remote server as part of a remote session connection sequence for connecting the client to the remote server, and wherein the remote server also determines if any of the unchangeable secure settings have changed in order to verify the integrity of the configuration file and prior to connecting the client to the remote server in the remote session.

2. The method of claim 1, wherein the determining if the secure settings have changed comprises:

generating a hash of the secure settings within the configuration file;

decrypting an encrypted hash of the secure settings; and comparing the generated hash with the decrypted hash of the secure settings for determining if the at least one of the secure settings has changed.

3. The method of claim 2, wherein the encrypted hash of the secure settings is signed by a trusted source that created the configuration file.

4. The method of claim 3, wherein the trusted source is the remote server that signs the secure settings with a key in order to have fine grained control over settings that effect performance or otherwise compromise security of the remote server.

5. The method of claim 2, wherein the encrypted hash is included within the configuration file along with a list of the secure settings.

6. The method of claim 2, wherein the secure settings for hashing are based on a default list defined by the trusted source.

7. The method of claim 1, wherein the configuration file is a remote desktop protocol (RDP) file.

8. The method of claim 1, wherein the determination of the secure settings is based on a trust level between the client and the remote server, wherein a higher degree of trust between the client and the remote server allows for a higher number of the configurable settings and less of the secure settings.

9. The method of claim 8, wherein at least one of the one or more secure settings are marked as a must not change regardless of the trust level between the client and the remote server.

10. The method of claim 1, wherein the configuration file is published by a source that secured the secure settings, and wherein upon determining the integrity of the secure settings the method also determines if the configuration file should be used based on a trust level for the publishing source, the method further comprising:

identifying a first trust level of the publishing source based on whether or not the configuration file is signed or unsigned by the publishing source, wherein if the configuration file is signed, a second level of trust is identified for the publishing source based on one or more certificates used to sign the configuration file; and based on the first trust level, second trust level, or both, determining if the configuration file should be used for allowing the client access to the one or more computing resources of the remote server.

11. The method of claim 10, wherein the first, second, or both, trust levels are determined upon opening the configuration file such that only upon ensuring that a signature is from a trusted source will the client be allowed to open the configuration file for editing the one or more configurable settings.

12. The method of claim 10, wherein the first, second, or both, trust levels are determined upon initiating a connection to the remote server in order to allow the client to open and edit the configurable settings of the configuration file, but only initiate a connection with the remote server if the configuration file is trusted.

13. The method of claim 10, wherein the client presents a user with an option to trust publishing source, wherein the client receives user input indicating that the publishing source should be trusted and an identifier for the configuration file is added to a registry of trusted configuration files in order to allow the use of the configuration file in subsequent connections to the remote server.

14. In a distributed computing system that allows a client remote access to computing resources of a remote server, a method of protecting against malicious or unintentional change of settings by securing a portion of a configuration file used during connectivity with the remote server, the method comprising:

a publishing source receiving a plurality of configuration settings used during communication between a client and a remote server when allowing the client access to one or more computing resources of the remote server;

the publishing source identifying a subset of the plurality of configuration settings as unchangeable secure settings, wherein the remaining settings for the plurality of configuration settings are configurable settings which are allowed to be set by the client as desired;

the publishing source creating a configuration file by securing the unchangeable settings therein to generate secure settings used to verify an integrity thereof such that any change to the unchangeable secure settings will invalidate the configuration file and prevent the client from access to the one or more computing resources of the remote server; and the publishing source sending the configuration file to the client for use in connecting with the remote server during a remote session through which the client will be granted access to one or more resources at the remote server, wherein both the client and the remote server each independently determines if any of the unchangeable secure settings have changed within the configuration file in order to verify the integrity of the configuration file and prior to connecting the client to the remote server through the remote session.

15. The method of claim 14, wherein the configuration file is signed by a publishing source that created the configuration file in order to allow the client, the remote server, or both, to further authenticate the configuration file based on a trust level with the publishing source.

16. The method of claim 15, further comprising:

taking a hash of the one or more secure settings in the configuration file;

signing the hash with the publishing source's private key; and including the signed hash within the configuration file prior to sending the configuration file to the client.

17. The method of claim 15, wherein the secure settings are signed by the remote server with a key in order to have fine grained control over settings that effect performance or otherwise compromise security of the remote server.

18. The method of claim 15, wherein the configuration file is a remote desktop protocol (RDP) file.

\* \* \* \* \*